No. 819,350. PATENTED MAY 1, 1906.
J. H. JANSSEN & F. T. KOESTER.
LONG DISTANCE LEVEL.
APPLICATION FILED MAY 31, 1905.
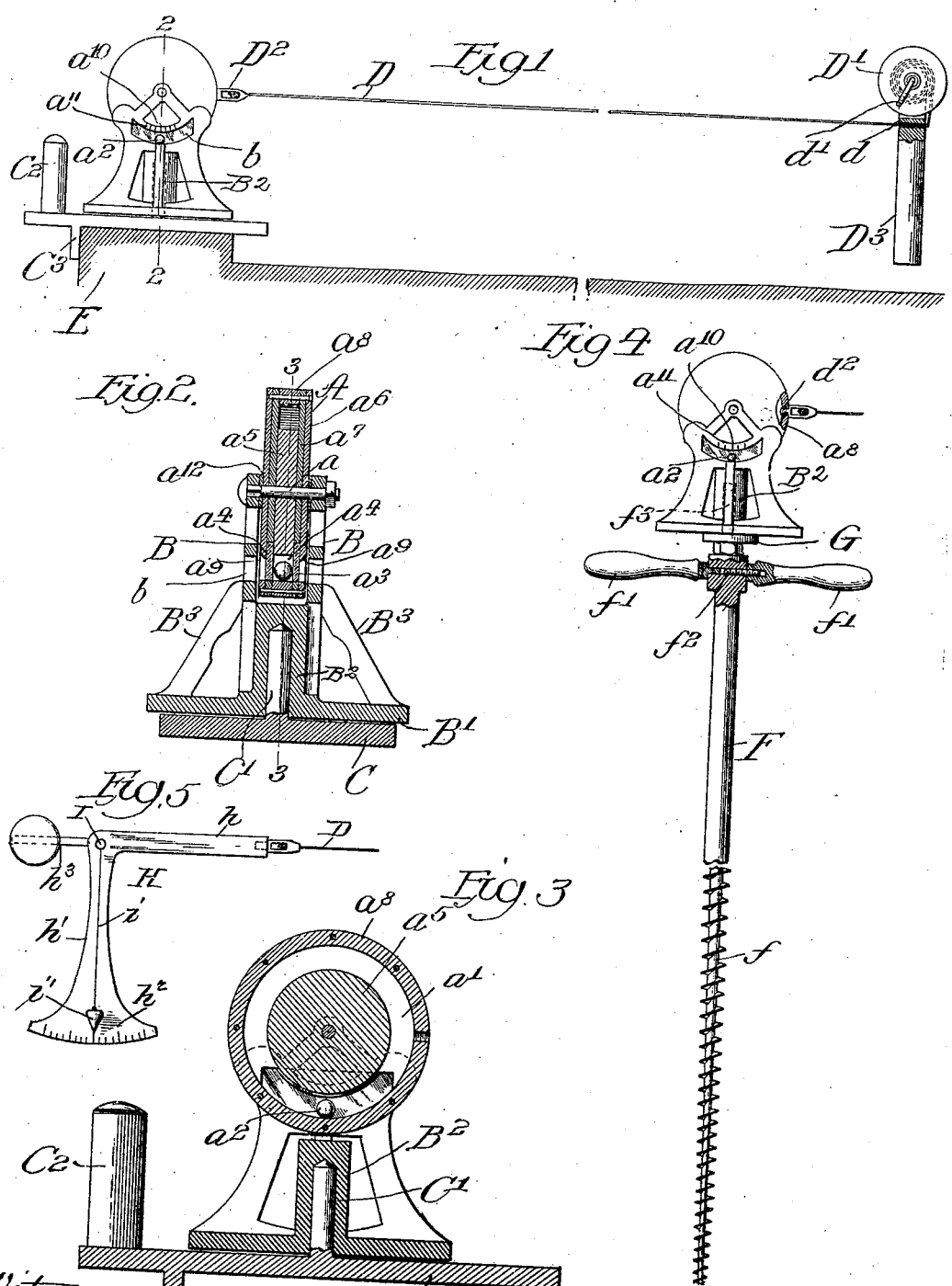

UNITED STATES PATENT OFFICE.

JOSEPH H. JANSSEN AND FREDERICK T. KOESTER, OF CHICAGO, ILLINOIS.

LONG-DISTANCE LEVEL.

No. 819,350.　　　　Specification of Letters Patent.　　　Patented May 1, 1906.

Application filed May 31, 1905. Serial No. 263,112.

*To all whom it may concern:*

Be it known that we, JOSEPH H. JANSSEN and FREDERICK T. KOESTER, citizens of the United States, residing at Chicago, in the county of Cook and State of Illinois, have invented certain new and useful Improvements in Long-Distance Levels; and we do hereby declare that the following is a full, clear, and exact description thereof, reference being had to the accompanying drawings, and to the letters of reference marked thereon, which form a part of this specification.

This invention relates to a novel long-distance leveling device or instrument adapted for leveling building foundations, sidewalks, and other like work of a length within the practical range of the instrument.

Among the objects of our invention is to produce an exceedingly simple, reliable, and inexpensive instrument for long-distance leveling and one which may be used by those not specially skilled in the use of instruments for this purpose now in use.

A long-distance leveling instrument embodying our invention embraces in general terms a leveling member adapted to be rotatively or pivotally mounted on a suitable stationary support located at a starting-point or position of known or prescribed horizontal distance from the surface of the ground and a cord or cable attached to said leveling member and adapted to be pulled outwardly therefrom and held taut and to be brought to a horizontal or other predetermined position through the aid of an indicating device carried by the leveling member, so as to determine therefrom the proper levels of distant objects. The leveling member includes a suitable indicating device by which may be determined the horizontal or other desired position of the leveling-cord. The leveling member may readily be arranged and operated to indicate a divergence of the leveling-cord from the horizontal, measured in degrees, either above or below the horizontal. Conveniently the leveling-cord is wound upon a reel when not in use and is unwound therefrom as the person who handles the cord moves away from the leveling member of the instrument. Said reel is provided with a shank or handle by which it is held as the cord is wound upon and unwound therefrom, and the handle may bear a defined relation with respect to its length to the distance between the axis of rotation of the leveling member and its support for a purpose to be described. If, for instance, the person whose duty it is to draw the cord outwardly for leveling distant objects or for determining the level at distant points also drives stakes for the purpose of permanently indicating such level, the stakes are driven successively and each stake leveled as it is driven. After the first stake has been driven and leveled the stake-driver moves forwardly the distance of another stake and drives another stake and levels the same in the same manner as before. The person who has charge of the leveling instrument at the starting-point indicates to the person handling the cord, by reference to the leveling member, when the instrument indicates that the cord occupies a horizontal or other desired position, and from the cord the distant objects are leveled. The leveling operation continues until the limit of the strength of the string or cord is reached, such limit being that beyond which it becomes impracticable to maintain the cord taut.

As shown in the drawings, Figure 1 illustrates the manner of using our improved long-distance level, showing the instrument at the starting position and the reel on which the leveling-cord is wound at a distance therefrom. Fig. 2 is a vertical section taken on line 2 2 of Fig. 1. Fig. 3 is a vertical section taken on line 3 3 of Fig. 2. Fig. 4 illustrates another manner of supporting the instrument at the starting-point. Fig. 5 illustrates a modified form of our invention.

The form of leveling member which forms part of the instrument located at the starting-point of a predetermined level (shown in Figs. 1 to 4, inclusive) embraces a disk freely rotative on a horizontal axis and is therefore balanced, and said disk carries an indicator by which is indicated the level or other position of the cord. Said circular leveling member A is mounted on a short shaft $a$, extending between and attached to the upper ends of lateral frame members B B, which are attached to or formed integral with a base-plate B', which latter is preferably rotatively mounted, and thus constitutes a turn-table. Said base-plate or turn-table B' is mounted on a supporting-plate C, that is provided with a central bearing-stud C', which has bearing in a central socket in the base-plate B' and formed, as herein shown, in a hollow vertical extension $B^2$ of said base-plate. Preferably the frame rising from the base-plate or turn-table B' is strengthened by lateral braces $B^3 B^3$, as shown in Fig. 2, and said base, side frame members, and braces are desirably made of an integral casting. Said disk A is provided near its periphery with an annular ball-race $a'$, within which is located a ball $a^2$, which finds its resting-place at the lowest part of said race, and therefore vertically below the axis of rotation of the disk. The disk or leveling member is provided at its lateral sides, preferably both sides, near its lower part with openings $a^3$, through which the ball is exhibited, and the walls of the ball-race opposite said sight-openings are made transparent, as by pieces of glass $a^4$, so as to confine the leveling-ball, while permitting its position to be observed. The side members B of the frame are provided in line with the sight-openings of the disk with like-shaped openings $b$, whereby said frame does not conceal the ball. It may be observed that the curved race need not be a complete circle, but only a short segment at the lower side of the disk, but greater in length than the sight-opening.

The disk may be constructed in any suitable manner to provide a ball-race of the required length and having transparent side walls through which the ball is exhibited. As herein shown, the disk comprises a central circular plate $a^5$ and outer and inner circular plates $a^6$ $a^7$, concentric with and of greater diameter than the plate $a^5$ and fitted flat together and flat against said central plate. A ring $a^8$ is fitted between and attached to the margins of said side plates $a^6$ $a^7$, and the annular ball-race $a'$ (shown in Fig. 3) is formed between said ring $a^8$ and the central plate $a^5$. The side plates $a^6$ $a^7$ are provided with the registering openings which constitute the sight-openings before referred to. The glass or other transparent side walls of the lower part of the raceways are seated in the openings of the inner side plates $a^7$. The openings in the outer side plates are made somewhat smaller, so that the upper margins of the glass plates are confined between the outer circular plates $a^6$ and the central plate $a^5$, whereby the glass plates are held in place. The plates are beveled above the upper margins of the openings $a^3$, as shown at $a^9$ in Fig. 2, and on each beveled margin, as herein shown, is located a scale-mark $a^{10}$, Figs. 1 and 4, which registers with the ball when the leveling member is in position to bring the taut leveling-cord D horizontal. The outer plates $a^6$ are provided with bosses $a^{12}$, which are made of such width as to hold the frame member separated from the disk except at said bosses, thus minimizing the friction between the rotative and stationary parts.

The cord D is preferably wound at its end remote from the leveling member upon a reel D' and is attached to the leveling wheel or member by means of a metal loop $D^2$, having screw-threaded engagement with the ring $a^8$, constituting the periphery of the leveling member or disk. As herein shown, the cord is passed through a hole in the outer end of the loop and is knotted to hold it attached to the loop. The reel D' is mounted between the arms $d$ of a handle or shank $D^3$, as shown in Fig. 1, and is provided with a crank $d'$, by which the cord is wound thereon. The cord passes to the reel through a transverse guide-opening in the shank, thereby fixing a constant distance between the cord and the lower end of said shank. The leveling-cord may be held immovable in the shank $D^3$ of the reel when the cord is being stretched taut by pinching the cord between the thumb and the rear face of the shank. When the instrument is not in use, the cord is disconnected from the disk or leveling member A by unscrewing the loop $D^2$ therefrom.

The support C, upon which the instrument at the starting-point is mounted, consists of a plate that is adapted to be placed flatwise upon the stationary object from which the leveling operation is begun. For instance, in building sidewalks said supporting-plate may be placed upon the curb, (indicated at E in Fig. 1,) the leveling operation being thereafter calculated from the level of said curb. The plate C may be provided with a depending lug $C^3$ and a handle $C^2$, by which it is held firmly upon its support against the pull of the leveling-cord.

Where no stationary object is at hand, as the curb E, (shown in Fig. 1,) upon which to support the leveling instrument, we may provide a suitable rod or support F, (shown in Fig. 4,) which is provided with screw-threads $f$, by which it may be turned into the ground, so as to adjust the upper end thereof at a greater or less height from the surface of the ground. In order to thus turn the rod into and out of the ground, it is provided near its upper end with handles $f'$ $f'$. A suitable manner of attaching the handles to the rod is to provide one of said handles with a screw-threaded shank $f^2$, which extends through a transverse opening in the rod and engages a screw-threaded socket in the other handle. Said rod is provided above said handles with a horizontal supporting-plate G, corresponding to the supporting-plate C before referred to, and is also provided above said plate with a reduced central stud $f^3$, adapted to enter the socket in the part $B^2$ of the instrument, (shown in dotted lines in Fig. 4,) whereby the instrument may rotate on its support to permit the leveling-cord to be drawn in any direction from the starting-point.

The reel-shank $D^3$ is preferably so related to the instrument at the starting position that the distance between the lower end of the shank and the opening through which extends the cord D equals the distance between the axis of rotation of the leveling member or disk A and the bottom of the support C or G, depending on which the instrument is supported.

The operation of the instrument is as follows: The leveling instrument is mounted and fixed upon a suitable support, (as either of the supports shown,) and the cord D is attached to the leveling member or disk A by screwing the loop $D^3$ into the periphery of said disk in the manner described. Thereafter one of the two persons operating the device stands at the stationary instrument carrying the leveling-machine, and the person driving the leveling-stakes or otherwise leveling distant objects grasps the shank of the reel D' and walks away from the instrument the distance required for the first stake, unwinding the cord the while from the reel, and drives the first stake. In the preferred form of the device the shank $D^3$ of the reel is of such length that when the stake is driven to the proper depth the leveling-line D is horizontal when the shank $D^3$ rests on the top of the driven stake. This will indicate that the top of the stake is at the same level as the bottom of the support C or G from which the level is calculated. The stake-driver is apprised by predetermined signals from the person at the starting-point when the leveling-cord D is approaching or has reached a horizontal or other desired position with the reel-shank resting on the driven stake. The horizontal position of the cord is found when the leveling-ball $a^2$, which is always at the lowest level of the raceway $a'$, registers with the central or scale mark $a^{10}$ of the disk. The stake-driver then passes on to the next position for driving the stake and unwinds the cord from the reel as he thus proceeds, and so on until the limit of range of the device is reached. It will be understood that the device is tested before being sent out for use. This may be mathematically effected by laying out the disk so as to insure that the point of attachment of the leveling-cord shall be located ninety degrees from the scale or indicating mark $a^{10}$. Again, such test may consist in placing the instrument when mounted on its support C or G on a level table of the required length and thereafter drawing the leveling-cord D outwardly therefrom, as indicated in Fig. 1, and resting the shank of the reel on the table. The ball is at this time resting vertically beneath the axis of the disk and the scale-mark is impressed or otherwise placed on the disk in line with the ball. At such time the string or cord D is horizontal and is at right angles to a plane passed through the axis of rotation of the leveling member or disk and through the ball and scale-mark. It will thereafter be known in use that when the cord is drawn taut and the scale-mark $a^{10}$ registers with the ball the cord will be horizontal.

In addition to the central scale-mark $a^{10}$ (indicated on the disk or leveling member) we may provide on either or both sides of said central scale-mark other scale-marks $a^{11}$ to indicate a desired angle either above or below the horizontal. Moreover, the same general results may be secured by providing the shank of the reel-holder with scale-marks for the same general purpose, in which latter event said shank instead of being set on top of the driven stake will be placed at one side thereof and the scale-marks made to register with the top of the stake or other object.

In lieu of the indicating device carried by the leveling member, consisting of the self-centering or gravity-actuated ball $a^2$ and its race, we may provide a plumb-bob consisting of a short strand attached at one end to the shaft $a$ or axis of rotation of the leveling member and provided at its other end with a weight adapted to coöperate with a scale-mark, as does the ball in the construction shown. This construction is shown in Fig. 5, wherein a different form of leveling member is shown. As shown in said drawings, H designates the leveling member as a whole, comprising a horizontal arm $h$, to which the leveling-cord D is attached, and a vertical arm $h'$, provided at its lower end with a curved lower end $h^2$, designed to receive a scale or indicating mark or marks. The leveling member is rotatively mounted on a shaft I, the frame or support of which is omitted for sake of clearness. A plumb-bob is suspended from the shaft I or a part coaxial therewith. It consists of a strand $i$, attached to the support referred to, and a weight $i'$, suspended from the lower end thereof and designed to coöperate with the scale or indicating mark or marks on the part $h^2$ to indicate the level of the arm $h$ and line D. Preferably said leveling member is balanced by means of a counterweight $h^3$, extending opposite from the arm $h$. Moreover, other forms of leveling members and indicating devices may be employed without departing from the spirit of our invention. The disk form of leveling member is a desirable one, however, by reason of the fact that it is accurately counterbalanced, so that when drawing the string or cord D away from the same the only practical resistance to drawing the cord straight is that due to the weight of the cord between its two points of support.

We claim as our invention—

1. A long-distance leveling device, comprising a support rotative on a vertical axis, a leveling member rotatively mounted thereon to rotate in a vertical plane, and a leveling-cord attached to said leveling member.

2. A long-distance leveling device, comprising a balanced rotative leveling member, a leveling-cord attached thereto, a reel upon which said cord is wound and a shank on which said reel is rotatively mounted.

3. A long-distance leveling device, comprising a rotatively-mounted leveling member, a leveling-cord attached thereto, a reel upon which said cord is wound and a shank on which said reel is rotatively mounted, said shank being provided with a transverse aperture through which the leveling-cord passes to the reel.

4. A long-distance leveling device comprising a frame or support, a leveling member rotatively mounted thereon, a leveling-cord attached to said leveling member, a reel upon which said cord is wound and a shank on which said reel is rotatively mounted, said shank being provided with a transverse aperture through which said cord passes to the reel, the parts being so arranged that the distance between said aperture and the lower end of the reel is equal to the distance between the axis of rotation of the leveling member and the lower part of its support.

5. A long-distance leveling device comprising a balanced rotatively-mounted leveling member and a leveling-cord attached thereto.

6. A long-distance leveling device comprising a frame or support, a circular leveling member concentrically and rotatively mounted on said support, and a leveling-cord attached to the periphery of said leveling member.

7. A long-distance leveling device comprising a rotative, circular leveling member, a level-indicator, a scale or indicating mark on said member coöperating with said indicator, and a leveling-cord attached to the periphery of said leveling member.

8. A long-distance leveling device comprising a rotative leveling member provided at its lower side with a curved ball-race, a ball located in said race, and a leveling-cord attached to said leveling member.

9. A long-distance leveling device comprising a rotative leveling member provided with a curved ball-race, a ball located in said race, and a leveling-cord attached to said leveling member, said leveling member being provided with a scale which coöperates with said ball.

10. A long-distance leveling device comprising a circular rotative leveling member provided with a ball-race, curved concentrically with the axis of rotation of said member, a ball located in said race, and a leveling-cord attached to the periphery of said leveling member.

11. A long-distance leveling device comprising a circular rotative leveling member provided with a ball-race, curved concentrically with the axis of rotation of said member, a ball located in said race, a leveling-cord attached to the periphery of said leveling member, and a reel upon which said leveling-cord is wound.

12. A long-distance leveling device comprising a support, a disk rotatively mounted thereon and provided with a curved raceway, a ball located in said raceway, the side wall of said raceway being made of transparent material, a scale or indicating mark on said disk coöperating with said ball, and a leveling-cord attached to the periphery of the disk.

13. A long-distance leveling device comprising a frame, a leveling member rotatively mounted thereon, a leveling-cord attached to said member, said frame being provided with a downwardly-opening socket and a support for the frame provided with a vertical stud having bearing in said socket.

In testimony that we claim the foregoing as our invention we affix our signatures, in presence of two witnesses, this 26th day of May, A. D. 1905.

JOSEPH H. JANSSEN.
FREDERICK T. KOESTER.

Witnesses:
WILLIAM L. HALL,
E. B. WILKINS.